Dec. 16, 1969  B. A. DANNER  3,484,139

RESILIENTLY MOUNTED TRACK ROLLER

Filed Dec. 16, 1968  2 Sheets-Sheet 1

Inventor
Bill A. Danner
By Charles L. Schwab
Attorneys

Dec. 16, 1969  B. A. DANNER  3,484,139

RESILIENTLY MOUNTED TRACK ROLLER

Filed Dec. 16, 1968  2 Sheets-Sheet 2

Inventor
Bill A. Danner
Attorney

United States Patent Office 3,484,139
Patented Dec. 16, 1969

3,484,139
RESILIENTLY MOUNTED TRACK ROLLERS
Bill A. Danner, Springfield, Ill., assignor to Allis-Chalmers Manufacturing Company, Milwaukee, Wis.
Filed Dec. 16, 1968, Ser. No. 783,852
Int. Cl. B62d 55/14; B60g 11/22; F16f 1/44
U.S. Cl. 305—27
8 Claims

ABSTRACT OF THE DISCLOSURE

A tandem roller assembly is provided in the suspension for an endless track of a crawler tractor, including a pair of rollers mounted in tandem on a subframe which, in turn, is mounted within a pocket in the track frame by a pair of longitudinally spaced rubber-like cushions permitting vertical and oscillating movement in a vertical longitudinal plane. A restraining means on the track frame maintains a preload on the cushions, provides a fulcrum for the subframe and maintains the subframe in assembly with the track frame.

This invention relates to an improved suspension for track rollers of a crawler tractor and particularly to the resilient mounting of a tandem track roller assembly.

It is an object of the present invention to provide a tandem track roller assembly which is resiliently supported on the track frame in a manner permitting tandem oscillation.

It is a further object of this invention to provide a resilient support for a tandem track roller assembly in which longitudinally spaced rubber-like suspension members are placed in both shear and compression loading.

It is a further object of this invention to provide a resilient support for a pair of track rollers wherein they are mounted on a tandem subframe which allows the endless track belt to maintain good ground contact when traversing uneven terrain.

It is a further object of this invention to provide an improved suspension for an endless track vehicle which reduces noise, dampens vibration, prolongs service life of parts and allows higher speed tractor operations by affording improved rideability and operator comfort.

It is a further object of this invention to provide a resiliently mounted tandem track roller assembly which is permitted to oscillate on a fixed transverse axis when the tractor traverses relatively smooth terrain and wherein the tandem track roller assembly oscillates about a longitudinally shifting transverse axis when the tractor traverses rough terrain.

It is a further object of this invention to provide an improved tandem track roller assembly suspension of the type hereinbefore outlined wherein restraining means is provided which establishes a predetermined preload on the resilient suspension means, maintains the tandem track roller assembly on the track frame and establishes a transverse pivot or fulcrum for the tandem track roller assembly.

These and other objects and advantages of the present invention will be apparent to those familiar with the art when the following description is read in conjunction with the drawings in which.

Figure 1:
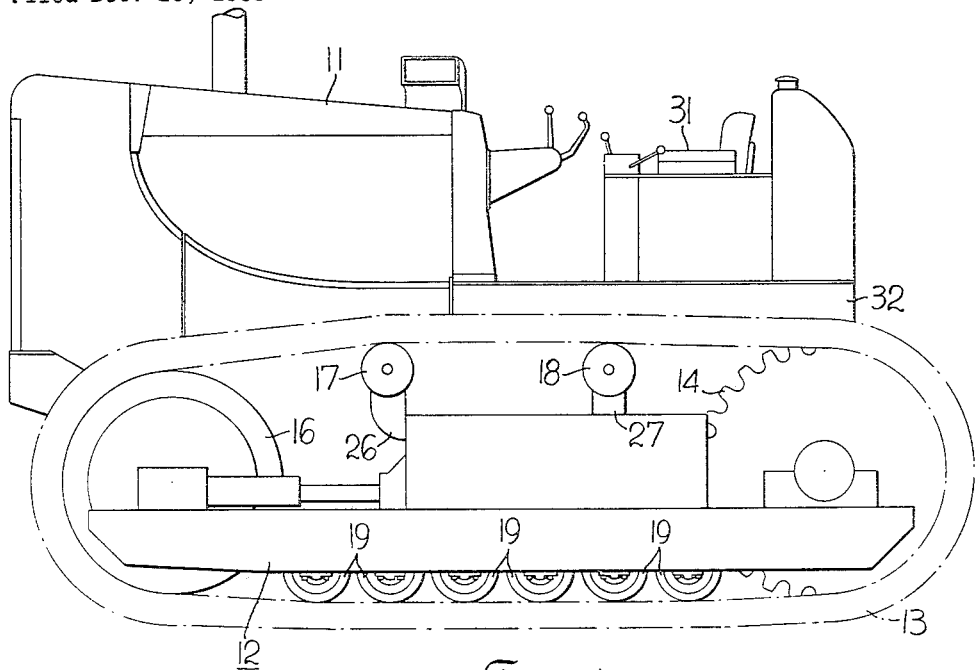
FIG. 1 is a side view of a crawler tractor in which the present invention is incorporated.

Referring to the drawings, the suspension for crawler tractor 11 includes a pair of support frames in the form of track frames, one at each side of the tractor. Only the left side track frame 12 is shown, but it would be understood that the right side track frame is a reverse image of track frame 12. Track frame 12 is pivotally connected at its rear to the main frame 32 for vertical oscillation relative thereto. The track frame 12 supports an endless track belt 13 by a driving sprocket 14, idler 16, upper support rollers 17, 18 and track rollers 19. The support rollers 17, 18 are rotatably mounted on the track frame by a pair of upstanding brackets 26, 27. The usual operator's station 31 is provided on the tractor main frame 32.

Figure 2:
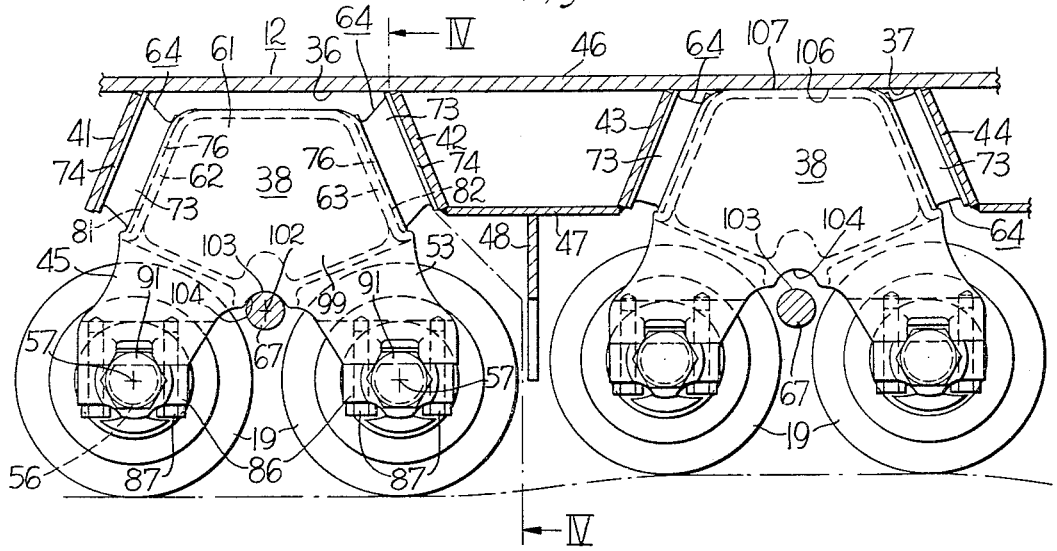
FIG. 2 is a side view of the track frame of the crawler tractor shown in FIG. 1 with parts broken away to illustrate a pair of tandem track roller assemblies of the present invention.

Referring to FIG. 2, the track frame 12 includes pockets 36, 37 for receiving tandem track rollers assemblies 38. Pocket 36 is defined by downwardly diverging transverse walls 41, 42 and the pocket 37 is similarly formed by downwardly diverging transverse walls 43, 44. The walls 41, 42, 43, 44 are welded at their upper ends of a horizontal plate or top wall 46 of the track frame 12. The lower ends of walls 42, 43 are welded to a horizontal brace plate 47. A downwardly extending transverse plate 48 is welded at its upper end to plate 47 and at its laterally opposite ends to the side walls 49, 51 shown in FIG. 4. The side walls 49, 51 include upwardly diverging plates 50, 55 and longitudinal angles 58, 59 welded thereto. The walls 41, 42, 43, 44, 46 and 47 are welded at their laterally opposite ends to the side walls 49, 51, respectively.

Figure 3:
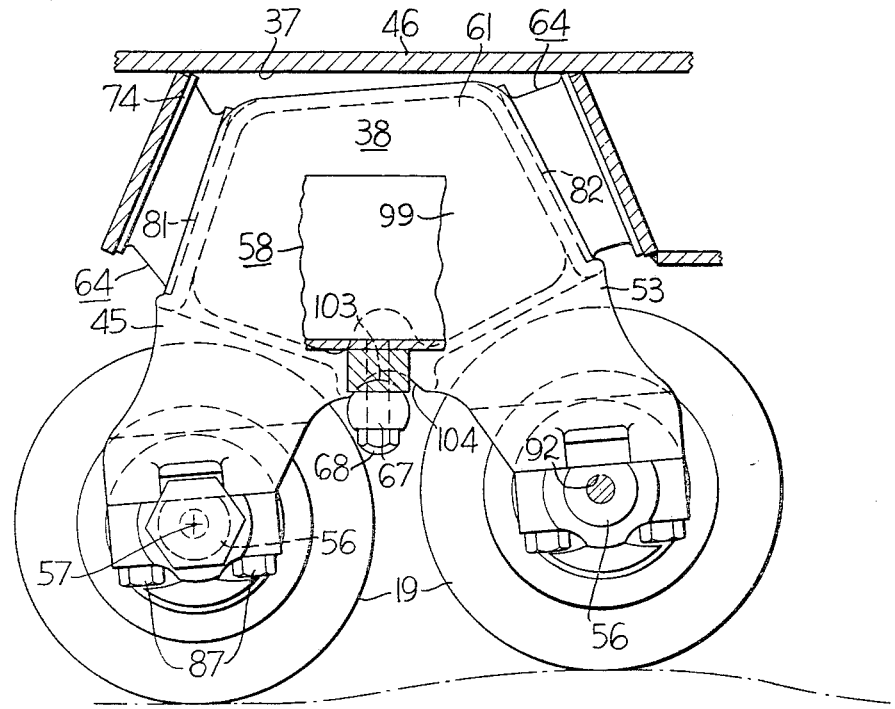
FIG. 3 is an enlarged side view of one of the tandem roller assemblies shown in FIG. 2 showing the oscillation which occurs when rough terrain is traversed.
Figure 4:
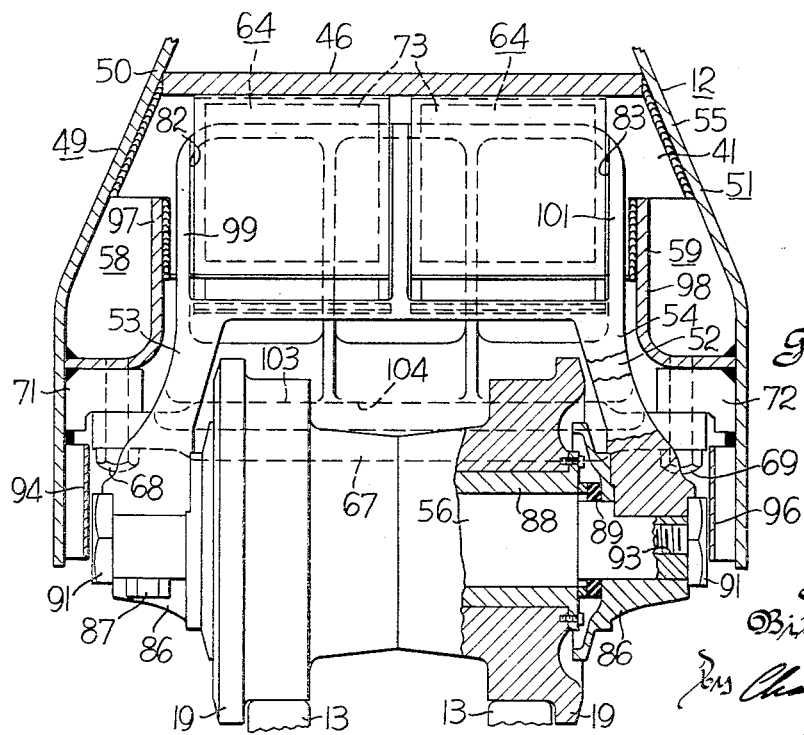
FIG. 4 is a view taken along the lines of IV—IV in FIG. 2 with parts broken away to show the mounting of the track roller to the tandem roller subframe.

Referring to FIGS. 2, 3 and 4, the tandem subframe 38 includes a pair of downwardly extending legs 45, 52 at its forward end and a pair of downwardly extending legs 53, 54 at its rearward end. The front legs 41, 42 rigidly and nonrotatably support the shaft 56 of track roller 19. Similarly, the rearwardly extending legs 53, 54 rigidly support a track roller 19. A subframe 38 includes an upper part 61 having upwardly diverging front and rear walls 62, 63 in confront relation to the walls 41, 42. Cushioning means in the form of four resilient rubber-like members or blocks 64 are interposed between the walls 41, 62 and 42, 63, respectively. These cushioning means are placed under a predetermined preload during installation and maintained in such condition by a transverse restraining bar 67 which is rigidly secured to brackets 71, 72 of track frame 12 by cap screws 68, 69. Each of the blocks 64 comprise a resilient rubber-like pad 73 bonded at opposite sides to metal plates 74, 76. The blocks 64 are not rigidly secured in place but rather the plates 76 fit in recesses of the walls 41, 42. Three of the four recesses are indicated by reference numbers 81, 82, 83. The upper ends of plates 74 abut against the top wall 46 of pockets 36, 37.

As shown in FIGS. 3 and 4, the track rollers 19 are mounted on nonrotating shafts 56 which are secured to the legs of subframes 38 by caps 86 and cap screws 87. The roller 19 includes a suitable bushing type bearing 88 and a face type seal 89 at each of its axially opposite ends. The exceptionally large heads of cap screws 91, which are threaded into tapped bores 92. 93, serve as vertical guides by cooperatively engaging abutment plates 94, 96 to laterally stabilize the subframe 38 relative to the track frame 12. The vertical flanges 97, 98 of angles 58, 59 also serve as stabilizing guides for the laterally opposite sides 99, 101 of the upper part 61 of the subframe 38. Thus, the angles 58, 59 of the side walls 49, 51 of the track frame, as well as plates 94, 96, serve to guide and stabilize the subframe 38 against lateral tilting and side shifting during tractor operation.

When operating over relatively smooth terrain, that is terrain with minor surface variations, the subframe will pivot about axis 102 of the cylindrical surface 103 of restraining bar 67. This condition is illustrated in the left side of FIG. 2 wherein the convex surface 103 of bar 67 cooperatively engages the concave bearing face surface 104 on subframe 38.

The concave face 104 has a greater radius of curvature than cylindrical surface 103 which not only aids in reseating of face 104 with surface 103, after temporarily moving out of engagement as shown in the right side of FIG. 2, but also allows the line of contact of the restraining bar with the face 104 to shift longitudinally when the terrain traversed is relatively uneven. Such an encounter with uneven terrain is shown in FIG. 3. Referring again to the right side of FIG. 2 the underside surface 106, of plate 46 is abutted by the top surface 107 of the tandem subframe 38, thus limiting upward movement of the subframe 38 as the tractor traverses uneven terrain of predetermined proportions.

The illustrated undercarriage is quiet and easy riding. Shock and vibration are substantially reduced, thus increasing the service life of the tractor. The smoother operation of the tractor over uneven ground permits the operator to operate the tractor at a higher speed in greater comfort without causing premature failure of parts. The tandem roller assembly oscillates as various surface irregularities are traversed, thus walking over obstacles with the least vertical displacement of track frame. The subframe not only oscillates about the restraining or pivot bar 67 in traversing washboard terrain but also moves upward off the bar 67 as shown in the right of FIG. 2 if an elevated surface area of predetermined magnitude and area is encountered, such as one inch high, as wide as the endless track belt 13 and as long as the center distance between the tandem rollers but less than the longitudinal distance between bars 67. By spacing the resilient cushioning means vertically above the axes 57 of the rollers 19, the most effective use of the resilient blocks 73 is obtained by virtue of their being placed under compression and shear loading.

The embodiments of the invention for which an exclusive property or privilege is claimed are defined as follows:

1. Suspension means for a track type tractor comprising:
   a support frame at each side of the tractor including downwardly extending front, rear and side walls defining a downwardly opening pocket,
   a tandem track roller assembly including
      a pair of track rollers spaced longitudinally of one another and
      a subframe having
         two pairs of downwardly depending legs supporting said rollers for rotation about transverse axes, respectively, and
         an upper part rigidly secured to said legs and extending into said pocket and
   cushioning means of rubber-like material interposed between said upper part of said subframe and an oppositely disposed pair of said walls, respectively, permitting resilient tandem oscillation of said subframe.

2. The combination of claim 1 wherein said oppositely disposed walls diverge downwardly.

3. The combination of claim 2 wherein said cushioning means includes portions disposed vertically above said rollers, respectively.

4. The combination of claim 1 and further comprising a downwardly facing, transverse concave bearing face on said subframe intermediate said rollers and a transverse bar secured to said support frame having a transverse convex surface in pivotal engagement with said bearing surface.

5. The combination of claim 4 wherein the radius of curvature of said concave bearing face is greater than the radius of curvature of said convex surface and wherein said bar subjects said cushioning means to a predetermined preload.

6. The combination of claims 1, 2, 3, 4 or 5 wherein said oppositely disposed walls are said front and rear walls, wherein said subframe is supported in said pocket by said cushioning means so as to permit resilient vertical movement of said subframe relative to said support frame and further comprising guide means on said support frame to stabilize said subframe against lateral side shifting.

7. The combination of claims 4 or 5 wherein said oppositely disposed walls are said front and rear walls and the latter diverge downwardly, said upper part presents a pair of longitudinally spaced upwardly diverging surfaces in confronting relation to said front and rear walls and said cushioning means includes portions disposed between said walls and upwardly diverging surfaces, respectively, said portions being disposed vertically above said rollers, respectively.

8. The combination of claims 1, 2 or 4 wherein said support frame is a track frame mounted on said tractor for vertical oscillation relative thereto and further comprising an idler pivotally mounted on the front of said track frame and a drive sprocket pivotally supported at the rear of said track frame.

References Cited

UNITED STATES PATENTS

| | | | |
|---|---|---|---|
| 1,571,628 | 2/1926 | Hendrickson | 305—27 |
| 2,116,835 | 5/1938 | Kegresse | 305—27 X |
| 2,360,619 | 10/1944 | Peterman | 267—63 X |
| 3,301,573 | 1/1967 | Hickman | 280—104.5 |
| 3,336,087 | 8/1967 | Reinsma | 305—27 |

RICHARD J. JOHNSON, Primary Examiner

U.S. Cl. X.R.

267—63; 280—104.5